United States Patent
Sugimura

(10) Patent No.: US 6,582,311 B1
(45) Date of Patent: Jun. 24, 2003

(54) MEMORY CARD DEVICE, VIDEO GAME APPARATUS, AND PROGRAM PROVIDING MEDIUM

(75) Inventor: Akihiro Sugimura, Kanagawa (JP)

(73) Assignee: Sony Computer Entertainment Inc. (JP)

( * ) Notice: Subject to any disclaimer, the term of this patent is extended or adjusted under 35 U.S.C. 154(b) by 0 days.

(21) Appl. No.: 09/202,795

(22) PCT Filed: Apr. 24, 1998

(86) PCT No.: PCT/JP98/01917

§ 371 (c)(1),
(2), (4) Date: Mar. 3, 1999

(87) PCT Pub. No.: WO98/48377

PCT Pub. Date: Oct. 29, 1998

(30) Foreign Application Priority Data

Apr. 24, 1997 (JP) .............................................. 9-107943

(51) Int. Cl.⁷ .......................... G06F 17/00; G06F 19/00
(52) U.S. Cl. ........................................... 463/43; 463/47
(58) Field of Search ............................... 463/10, 11, 30, 463/9, 40, 41, 42, 43, 44, 1, 37–39, 45, 47; 725/145, 147

(56) References Cited

U.S. PATENT DOCUMENTS

| | | | | |
|---|---|---|---|---|
| 5,184,830 A | * | 2/1993 | Okada et al. ................ | 273/433 |
| 5,428,528 A | * | 6/1995 | Takenouchi et al. ........ | 364/410 |
| 5,600,800 A | | 2/1997 | Kikinis et al. .............. | 395/281 |
| 5,759,100 A | * | 6/1998 | Nakanishi ..................... | 463/37 |
| 5,785,598 A | * | 7/1998 | Hsu ............................. | 463/44 |
| 5,791,994 A | * | 8/1998 | Hirano et al. ................. | 463/43 |
| 5,797,085 A | * | 8/1998 | Beuk et al. ................... | 455/88 |
| 6,007,428 A | * | 12/1999 | Nishiumi et al. ............. | 463/36 |

FOREIGN PATENT DOCUMENTS

| | | | |
|---|---|---|---|
| EP | 0 685 246 A1 | 12/1995 | |
| JP | 62-255192 | 11/1987 | |
| JP | 3-120918 | 5/1991 | |
| JP | 3-278994 | 12/1991 | |
| JP | 4-26432 | 1/1992 | |
| JP | 06-259615 | * 9/1994 | .......... G06K/19/07 |
| JP | 8-30841 | 2/1996 | |
| JP | 8-161438 | 6/1996 | |
| WO | WO 93/23125 | 11/1993 | |

* cited by examiner

Primary Examiner—Kim Nguyen
(74) Attorney, Agent, or Firm—Lerner, David, Littenberg, Krumholz & Mentlik, LLP

(57) ABSTRACT

A memory card device comprises an input unit such as button, etc., for operating stored program, a display unit for displaying information in accordance with the program, a control unit such as a microcomputer, having a program memory section for storing the program, a connector connecting to an equipment body such as a video game apparatus, and a non-volatile memory as a data storage. Data such as program or game result, etc. transferred from the video game apparatus body to the memory card device may be written into the non-volatile memory through the control unit. The memory card device is capable of executing a down-loaded program from the equipment body. Game result in the memory card device can be loaded into the equipment body.

6 Claims, 15 Drawing Sheets

MEMORY CARD DEVICE, VIDEO GAME APPARATUS, AND PROGRAM PROVIDING MEDIUM

TECHNICAL FIELD

This invention relates to a memory card device used as an auxiliary memory unit of information equipment, a video game apparatus having a function to store game data, etc. into an auxiliary memory unit, and a program providing medium.

BACKGROUND ART

A conventional memory card used in the state inserted into information equipment, etc. is caused to be of the configuration comprising interface for connecting to the body of information equipment and non-volatile memory element for storing data.

FIG. 1A shows an example of the configuration of the main part of such a conventional memory card. This conventional memory card 80 comprises a control unit 81 for controlling its operation, a connector 82 for connecting to terminal provided within slot of information equipment, etc., and a non-volatile memory 86 for storing data, wherein the connector 82 and the non-volatile memory 86 are connected to the control unit 81.

The control unit 81 is constituted by using, e.g., microcomputer. Moreover, as non-volatile memory 86, flash memory, e.g., EEPROM (Electrically Erasable Programmable Read Only Memory), etc. is used. Moreover, there are also instances where, for connection interface to information equipment, etc., microcomputer is used as control unit for interpreting protocol.

FIG. 1B shows control item in the control unit 81 of the conventional memory card 80.

As stated above, the conventional memory card comprises body connection interface for connecting to body of information equipment, etc. and memory interface for carrying out input/output of data with respect to non-volatile memory.

Moreover, conventional video game apparatus as in the home TV game apparatus has a function to store game data, etc. into the auxiliary memory unit. The above-described memory card is used also as auxiliary memory unit of such video game apparatus.

FIG. 2 shows an example of a conventional video game apparatus using memory card as auxiliary memory unit. A body 2 of this conventional video game apparatus (unit) 11 is accommodated within substantially square casing, and is composed of a disc mounting portion 3 onto which optical disc which is recording medium on which application program of the video game is recorded is loaded at the central portion thereof, a reset switch 4 for arbitrarily resetting game, a power switch 5, a disc operation switch 6 for operating loading of the optical disc, and, e.g., two slot portions 7A, 7B.

Memory card 80 used as the auxiliary memory unit is inserted with respect to these slot portions 7A, 7B, and, e.g., result, etc. of game executed on video game unit 11 is sent from the control unit (CPU) 19 and is written into the non-volatile memory 86. In this case, plural operation units (controllers) (not shown) are also connected to the slot portions 7A, 7B so that plural users can carry out waging war game, etc. at the same time.

As described above, the conventional memory card only comprises a body connection interface for connecting to body of information equipment, etc. and memory interface for carrying out input/output of data with respect to the non-volatile memory. Namely, the conventional memory card only has a function as merely auxiliary memory unit, and data stored in the non-volatile memory could not be utilized by memory card alone.

In addition, the conventional video game apparatus can operate application program only on the game apparatus body, and game result, etc. can be stored into memory card device used as the auxiliary memory unit. For this reason, game result, etc. stored in the memory card could not be effectively reflected for game executed at times subsequent thereto.

DISCLOSURE OF THE INVENTION

This invention has been made in view of the above-mentioned problems, and its object is to provide a memory card device which can not only simply store data, but also down loads application program to independently execute it, or to carry out cooperative operation while carrying out transmission/reception of its execution result between the memory card device and other information equipment.

Moreover, in order to solve problems as described above, another object of this invention is to provide a video game apparatus capable of down-loading application program of video game into memory card used as the auxiliary memory unit from the body of video game unit, or taking thereinto result of game independently executed on its memory card to carry out cooperative operation to constitute game executed at times subsequent thereto, etc., and a program providing medium for supplying application program.

Namely, a memory card device according to this invention comprises a memory for storing data and an interface connecting to information equipment, and functions as auxiliary memory unit of connected information equipment, the device comprising a program storage memory for storing program, a control unit for controlling execution of the program, a display unit for displaying information in accordance with the program to be executed, an operation input unit for operating the program, and a power supply unit for supplying power utilized for executing the program.

Moreover, a video game apparatus according to this invention is directed to a video game apparatus having a function to store game data obtained by executing game into an auxiliary memory unit, the apparatus comprising a program providing unit for supplying application program, a communication control unit connected to a main bus to which a central processing unit of the video game apparatus body is connected, and a slot connected to the main bus through the communication control unit and adapted so that the auxiliary memory unit is detachably connected, wherein the central processing unit has a control function to download application program from the program providing unit with respect to the auxiliary memory unit through the communication control unit.

Further, a video game apparatus according to this invention is directed to a video game apparatus having a function to store game data obtained by executing game with respect to an auxiliary memory unit, the apparatus comprising a program providing unit for supplying application program, a communication control unit connected to a main bus to which a central processing unit of the video game apparatus body is connected, and a common slot connected to the main bus through the communication control unit and adapted so that the auxiliary memory unit and a memory card unit are detachably connected, the auxiliary memory unit having a non-volatile memory for storing game data obtained by executing game by the video game apparatus body, the memory card device including a program memory for storing the down-loaded application program, and a control unit for executing the down-loaded application program independently of the video game.

Further, a memory card device according to this invention is directed to a memory card device having an interface connectable to information equipment, the memory card device comprising a program storage memory for storing program, a control unit for controlling execution of the program, a display unit for displaying information in accordance with the executed program, an operation input unit for operating the program, and a power supply unit for supplying power utilized for executing the program, wherein the program is down loaded into the program memory through an interface from the connected information equipment, and program down-loaded into the auxiliary memory unit and program executed in the information equipment body are application programs different from each other.

Further, a program providing medium according to this invention is directed to a providing medium for providing application program with respect to a video game apparatus (unit), wherein at least two different application programs are recorded with respect to the providing medium, and one of the at least two different application programs is application program executed in the video game unit and the other one is application program executed in memory card unit connected to the video game unit.

In accordance with this invention, there can be provided a video game apparatus having a function to down-load application program of video game with respect to a memory card device (unit) capable of independently executing program of down-loaded application software or capable of carrying out cooperative operation while carrying out transmission/reception of its execution result between the memory card unit and other information equipment, and memory card unit used as auxiliary memory unit, or to take thereinto result of game independently executed on its memory card unit to carry out cooperative operation to constitute games executed at times subsequent thereto, etc.

BEST MODE FOR CARRYING OUT THE INVENTION

Preferred embodiment of this invention will now be described with reference to the attached drawings. In the following description, a video game apparatus of the embodiment of this invention will be first described, and a memory card device of the embodiment of this invention will then be described. Finally, by taking, as an example, the case where the memory card device of the embodiment of this invention is applied as auxiliary memory unit of the video game apparatus of the embodiment of this invention, the cooperative operation therebetween will now be described.

Figures 1A, 1B:
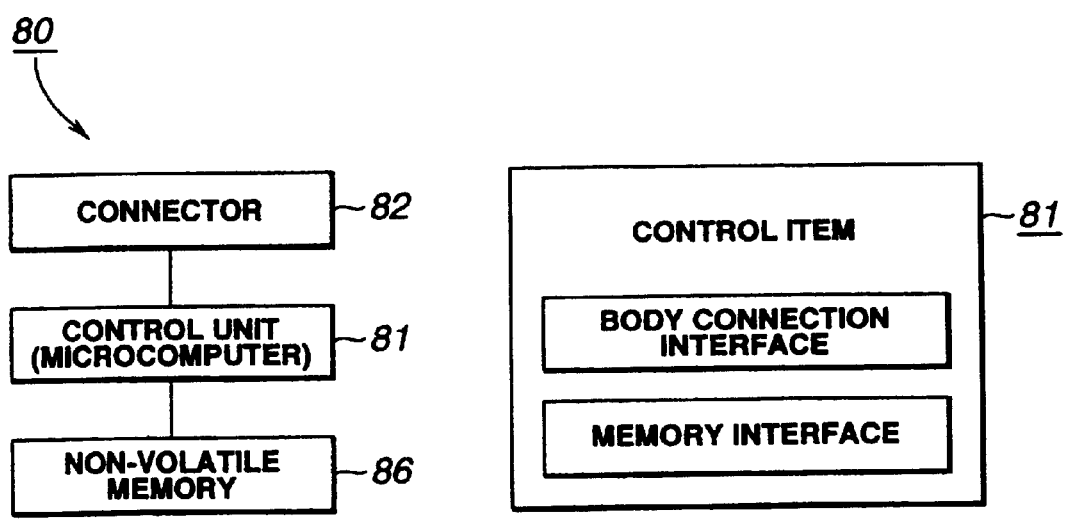
FIGS. 1A, 1B are views showing an example of the configuration of the main part of a conventional memory card device.
Figure 2:
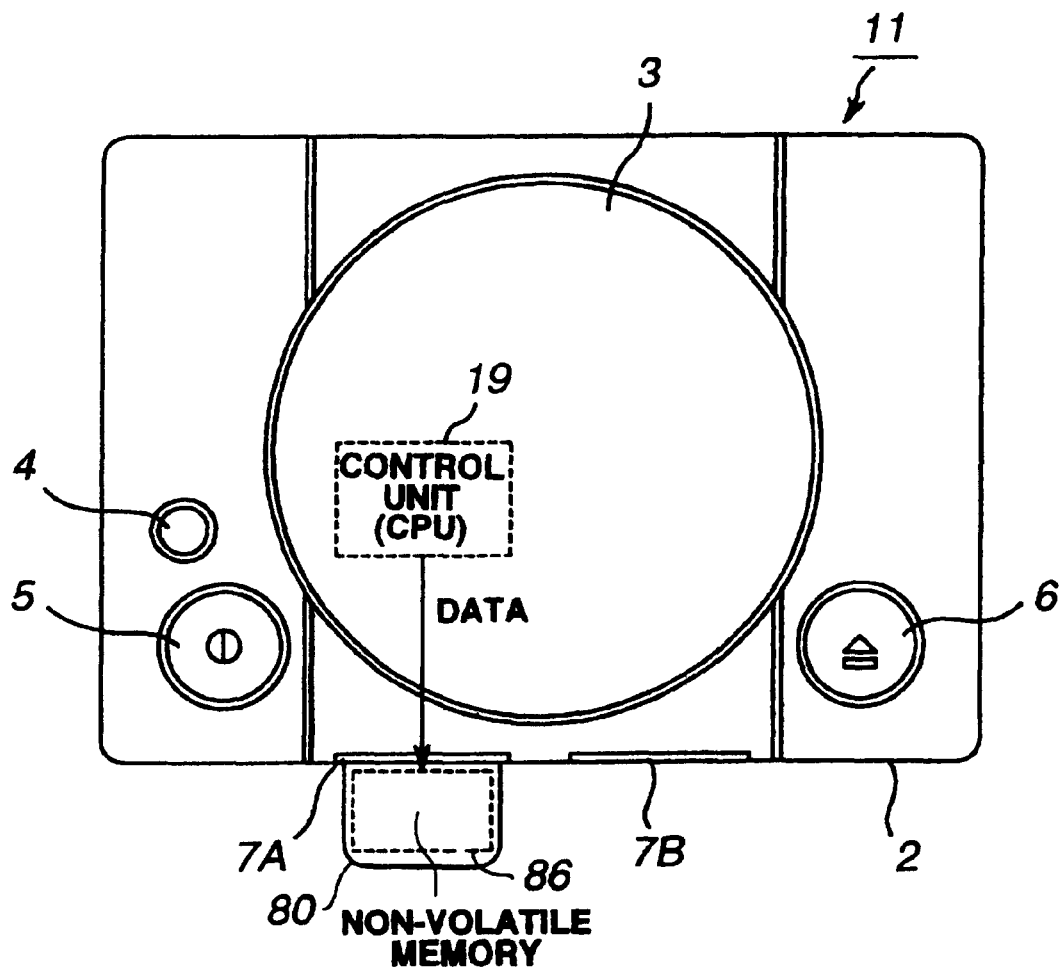
FIG. 2 is a view showing an example of a conventional video game apparatus in which memory card is used as auxiliary memory unit.
Figure 3:
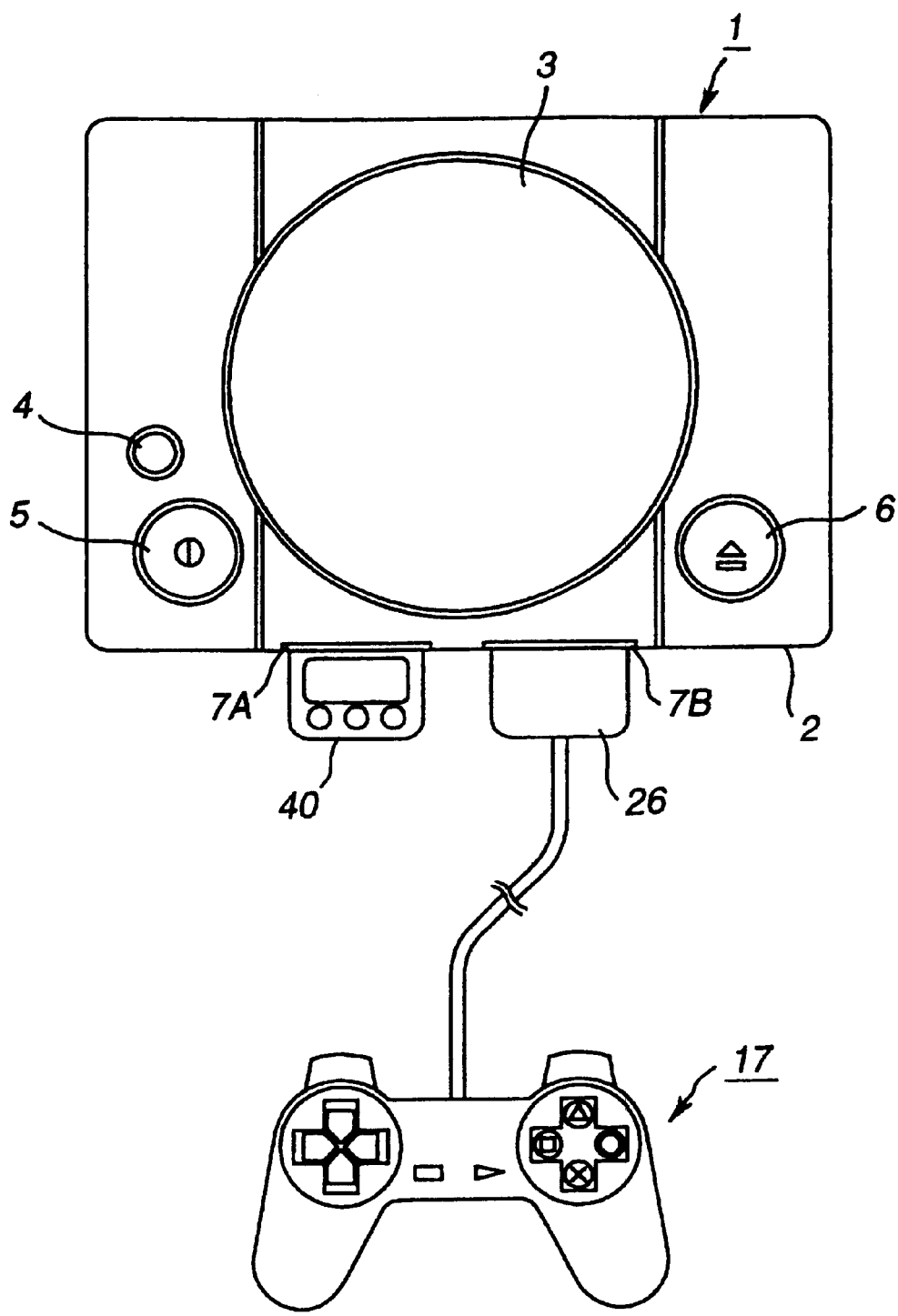
FIG. 3 is a view showing appearance of a video game apparatus according to this invention.

FIG. 3 shows appearance of video game apparatus as one form of the embodiment of this invention. This video game apparatus 1 serves to read out game program recorded on, e.g., optical disc, etc. to execute it in accordance with instruction (designation) from user (game player). In this case, execution of the game refers to mainly progression of game and control of display or speech.

A body 2 of the video game apparatus 1 is accommodated within substantially rectangular casing, and is caused to be of configuration comprising a disc loading portion 3 located at the central portion on which optical disc such as CD-ROM, etc. which is recording medium for supplying application program of video game is loaded, a reset switch 4 for arbitrarily resetting the game, a power switch 5, a disc operation switch 6 for operating loading of the optical disc, and, e.g., two slot portions 7A, 7B. The configurations of the respective portions are similar to the configurations of those of the previously described conventional video game apparatus 11, and the same reference numerals are respectively attached to common portions.

It is to be noted that the recording medium for supplying application program is not limited to the optical disc, but cartridge including semiconductor memory therewithin may be employed, and application program may be supplied through communication line.

At the slot portions 7A, 7B, two operation units 17 can be connected and two users can carry out waging war game, etc. In addition, memory card unit which will be described later may be inserted into these slot portions 7A, 7B. It is to be noted that while the structure provided with slot portions 7A, 7B of two systems is illustrated in FIG. 3, the number of systems is not limited to two.

Figure 4:
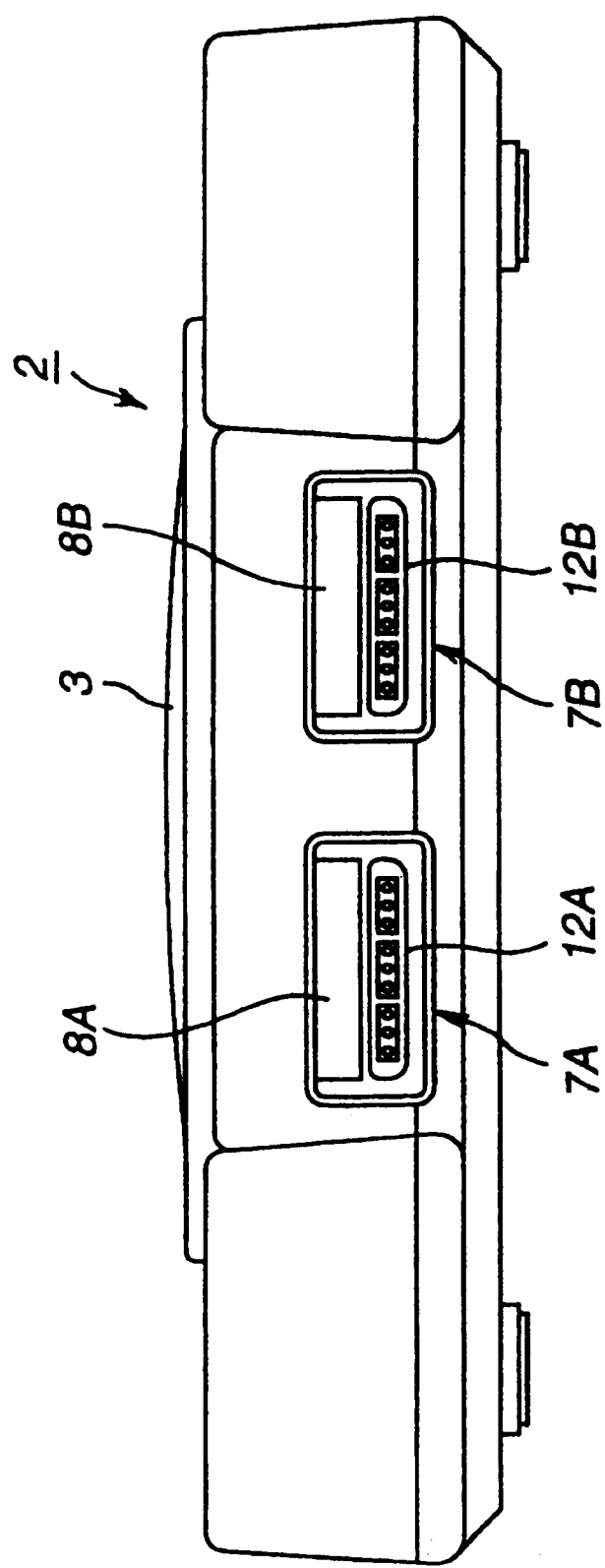
FIG. 4 is a view showing the state of slot portion of the video game apparatus.

FIG. 4 shows the state of the slot portions 7A, 7B provided at the front side surface of the body 2 of the video game apparatus 1 of the embodiment according to this invention.

In this embodiment, two steps of slot portions 7A, 7B are respectively formed and memory card insertion portions 8A, 8B into which memory card units 40A, 40B which will be described later are inserted are respectively provided at their upper steps and controller connecting portions 12A, 12B to which a connection terminal portion 26 is connected of the controller 17 are respectively provided at their lower steps.

Insertion holes (slots) of the memory card insertion portions 8A, 8B are caused to be of structure in which rectangular insertion holes long in lateral direction are formed to increase the degree of rounding of corners of both ends at its lower side as compared to corners of both ends of the upper side so that the memory card unit is not inserted into erroneous direction. In addition, at the memory card insertion portions 8A, 8B, there are respectively provided shutters for protecting connecting terminals for obtaining electrical connection provided therewithin.

On one hand, the controller connecting portions 12A, 12B are caused to be of the structure in which corners of both ends of the lower side of insertion hole which is rectangular in lateral direction are caused to have shape in which the degree of rounding is large as compared to corners of both ends of the upper side so that the connecting terminal portion 26 of the controller 17 is not connected in erroneous direction, and is caused to be of the structure in which respective shapes of the insertion holes are different from that of the memory card insertion portions 8A, 8B so that memory card is not erroneously inserted.

Figure 5:
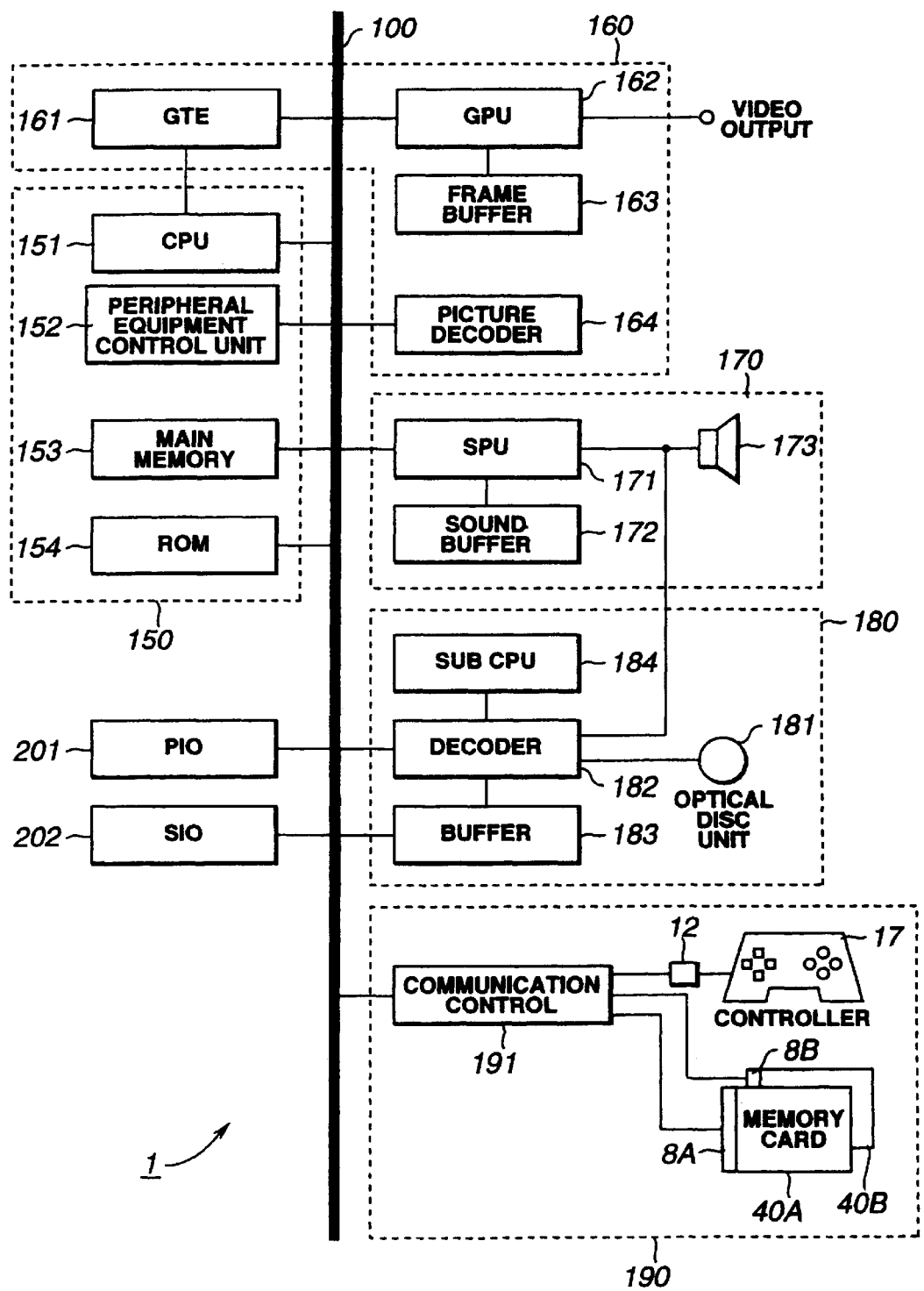
FIG. 5 is a block diagram showing an example of more practical configuration of the main part of a video game apparatus of the embodiment according to this invention.

FIG. 5 is a block diagram showing an example of more practical configuration of the main part of the video game apparatus 1.

This video game apparatus 1 is caused to be of configuration comprising a control system 150 composed of Central Processing Unit (CPU) 151 and its peripheral equipment, etc., a graphic system 160 composed of a picture processing unit (Graphic Processing Unit (GPU) 162 for carrying out picture describing with respect to the frame buffer 163, etc., a sound system 170 composed of Sound Processing Unit (SPU) for generating music or sound effect, etc., an optical disc control unit 180 for carrying out control of optical disc on which application program is recorded, a communication control unit 190 for carrying out input/output of signal from the controller 17 to which instruction (designation) from user is inputted and data from memory card units 40A, 40B for storing setting of game, etc., and a bus 100 to which the respective portions are connected, etc.

The above-mentioned control system 150 comprises a CPU151, a peripheral equipment control unit 152 for carrying out interruption control or control of Direct Memory Access (DMA) transfer, etc., a main memory (main memory unit) 153 comprised of Random Access Memory (RAM), and a Read Only Memory (ROM) 154 in which program so called operating system, etc. for carrying out management of graphic system 160 and/or sound system 170, etc. is stored. It is to be noted that the main memory referred to here is adapted to have ability to execute program on its memory.

The CPU 151 executes the operating system stored in the ROM154 to thereby control the entirety of this video game apparatus 1, and is comprised of, e.g., RISC-CPU of 32 bits.

Further, this video game apparatus 1 is adapted so that when power is turned ON, the CPU151 of the control system 150 executes operating system stored in the ROM154 so that the CPU151 carries out control of the graphic system 160 and/or sound system 170, etc. Moreover, when the operating system is executed, the CPU151 carries out initialization of the entirety of the video game apparatus 1 such as confirmation of operation, etc. thereafter to control the optical disc control unit 180 to execute application program of game, etc. recorded on the optical disc. By execution of program of game, etc., the CPU151 controls the graphic system 160 and/or the sound system 170, etc. in accordance with input from user to control display of picture, and/or generation of sound effect and music.

Moreover, the above-mentioned graphic system 160 comprises a Geometry Transfer Engine (GTE) 161 for carrying out processing of coordinate transform, etc., a GPU162 for carrying out picture description in accordance with describe instruction (indication) from the CPU151, a frame buffer 163 for storing picture described by this GPU162, and a picture decoder 164 for decoding picture data compression-encoded by orthogonal transform such as discrete cosine transform, etc.

The GTE161 comprises parallel arithmetic mechanism for executing in parallel, e.g., plural operations and is adapted to have ability to carry out, at high speed, coordinate transform, light source calculation, and operation of matrix or vector, etc. in accordance with operation request from the CPU151. In more practical sense, in this GTE161, in the case of operation for carrying out flat shading to paint, e.g., one triangular polygon by the same color, about 1,500,000 coordinate operations of polygons at the maximum for one second can be carried out. Thus, in this video game apparatus, load of the CPU151 is reduced and high speed coordinate operation can be carried out.

Moreover, the GPU162 carries out describe operation of polygon, etc. with respect to frame buffer 163 in accordance with describe instruction from the CPU151. This GPU162 can carry out about 360,000 describe operations of polygons at the maximum for one second.

Further, the frame buffer 163 is comprised of so called dual port RAM, and is adapted to have ability to carry out describe operation from the GPU162 or transfer from the main memory and read-out for display at the same time. This frame buffer 163 has, e.g., capacity of 1 M bytes, and is dealt as matrix having 1024 pixels in lateral direction and 512 pixels in longitudinal direction respectively having 16 bits. Moreover, in this frame buffer 163, there are provided, in addition to the display area outputted as video output, a CLUT area in which there is stored Color Look Up Table (CLUT) to which reference is made when GPU162 carries out describe operation of polygon, etc. and a texture area in which there is stored material (texture) inserted (mapped) into polygon, etc. described by the GPU162 after undergone coordinate conversion at the time of describe operation. The CLUT area and the texture area are adapted to be dynamically changed in accordance with change of the display area, etc.

In this example, the GPU162 is adapted to have ability to carry out, in addition to the above-described flat shading, glow shading for carrying out interpolation from color of vertex of polygon to determine color within polygon and texture mapping for attaching (sticking) texture stored in the texture area onto polygon. In the case of carrying out such glow shading or texture mapping, the GTE161 can carry out about 500,000 coordinate operations of polygons at the maximum for one sec.

Further, the picture decoder 164 decodes picture data of still picture or moving picture stored in the main memory 153 by control from the CPU151 to store it into the main memory 153.

Moreover, this reproduced picture data is stored into the frame buffer 163 through the GPU162 so that it can be used as background of picture described by the above-described GPU162.

The above-mentioned sound system 170 comprises a SPU171 for generating music or sound effect, etc. on the basis of instruction from the CPU151, a sound buffer 172 into which waveform data, etc. is recorded by this SPU171, and a speaker 173 for outputting music or sound effect, etc. generated by the SPU171.

The above-mentioned SPU171 has ADPCM decoding function for reproducing speech (sound) data which has been caused to undergo ADPCM (Adaptive Differential PCM), e.g., speech data of 16 bits being as difference signal of 4 bits, a reproducing function for reproducing waveform data stored in the sound buffer 172 to thereby generate sound effect, etc., and modulation function for modulating waveform data stored in the sound buffer 172 to reproduce it, etc.

By providing such functions, this sound system 170 can be used as the so-called sampling sound source for generating music or sound effect, etc. on the basis of waveform data recorded in the sound buffer 172 by instruction from the CPU151.

The above-mentioned optical disc control unit 180 comprises an optical disc unit 181 for reproducing program or data, etc. recorded on the optical disc, a decoder 182 for decoding program or data, etc. recorded in the state where, e.g., Error Correction Codes (ECCs) are added, and a buffer 183 for temporarily storing data from the optical disc unit 181 to thereby allow read-out operation of data from the optical disc to have high speed. A sub CPU184 is connected to the above-mentioned decoder 182.

Moreover, as speech data recorded on optical disc which is read out by the optical disc unit 181, there is so called PCM data in which speech signal has been caused to undergo analog/digital conversion in addition to the above-described ADPCM data.

Speech data recorded in the state where, e.g., difference of digital data of 16 bits is represented by 4 bits as ADPCM data is decoded into digital data of 16 bits by the decoder 182, and is then delivered to the above-described SPU171, at which processing such as digital/analog conversion, etc. is implemented by the SPU171. The speech data thus processed is used for the purpose of driving the speaker 173.

Moreover, speech data recorded as digital data of, e.g., 16 bits as PCM data is decoded into digital data of 16 bits by the decoder 182, and is then delivered to the above-described SPU171, at which processing such as digital/analog conversion, etc. is implemented by the SPU171. The speech data thus processed is used for the purpose of driving the speaker 173.

Further, the communication control unit 190 comprises a communication controller 191 for carrying out control of communication with the CPU151 through the bus 100, wherein a controller connecting section 12 to which controller 17 for inputting instruction (designation) from user is connected, and memory card insertion sections 8A, 8B to which memory cards 40A, 40B are connected as auxiliary memory unit for storing set data of the game, etc. are provided at the communication controller 191.

The controller 17 connected to the controller connecting section 12 has, e.g., sixteen designation keys for the purpose of inputting designation from user to transmit the state of this designation key about 60 times per sec. to the communication controller 191 by the synchronous communication in accordance with designation from the communication controller 191. In addition, the communication controller 191 transmits state of designation key of the controller 17 to the CPU151.

Thus, designation (instruction) from user is inputted to the CPU151. In response thereto, the CPU151 carries out processing in accordance with instruction from user on the basis of game program, etc. being executed.

In this case, between the main memory 153, the GPU162, the picture decoder 164 and the decoder 182, etc., it is necessary to transfer a large quantity of picture data at high speed in carrying out read-out of program, display of picture or describe operation, etc. In view of this, in this video game apparatus, there can be carried out so called DMA transfer to directly carry out transfer of data between the main memory 153, the GPU162, the picture decoder 164 and the decoder 182, etc. by control from the peripheral device control unit 152 without intervening CPU151 as described above. Thus, load of the CPU151 by data transfer can be reduced. As a result, high speed data transfer can be carried out.

Moreover, when it is necessary to store set data, etc. of game being executed, the CPU151 transmits its stored data to communication controller 191, and the communication controller 191 writes data from the CPU151 into memory card 40A or memory card 40B inserted into the slot of the memory card insertion portion 8A or the memory card insertion portion 8B.

In this example, protective circuit for preventing electric breakage is included within the communication controller 191. The above-mentioned memory cards 40A, 40B are separated from the bus 100, and can be attached/detached in the state where power of the device body is turned ON. Accordingly, in the case where memory capacity of the memory card 40A or 40B is insufficient, etc., new memory card can be inserted without interrupting the power supply of the device body. For this reason, new memory card can be inserted in the state where game data required to be backed up is not lost thus to write necessary data into the new memory card.

Moreover, a parallel I/O interface (PIO) 201, and a serial I/O interface (SIO) 202 are interfaces for connecting to other external equipments.

The memory card device of the embodiment of this invention will now be described. In the following description, explanation will be given on the premise that the memory card 40 of the embodiment according to this invention is inserted with respect to the video game apparatus 1 of the previously described embodiment according to this invention.

Namely, this memory card device 40 is inserted with respect to the memory card insertion portion 8 provided at the slot portion 7A or 7B of the video game apparatus 1, and can be used as peculiar memory card corresponding to connected plural operation units 17. For example, in the case where two users (game players) carry out game, this device has conventional function to respectively record their own game results, etc. with respect to two memory cards 40A, 40B.

Figure 6A:
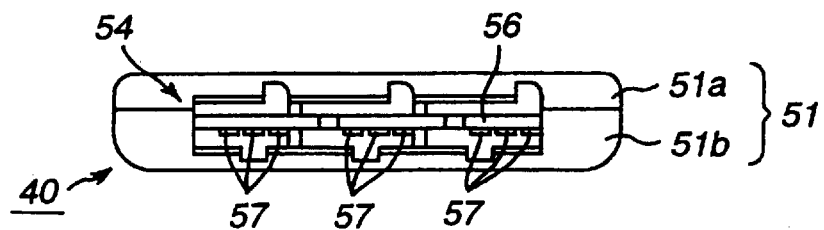
FIGS. 6A, 6B, 6C are views showing appearance of a memory card device of an embodiment according to this invention.
Figure 6B:
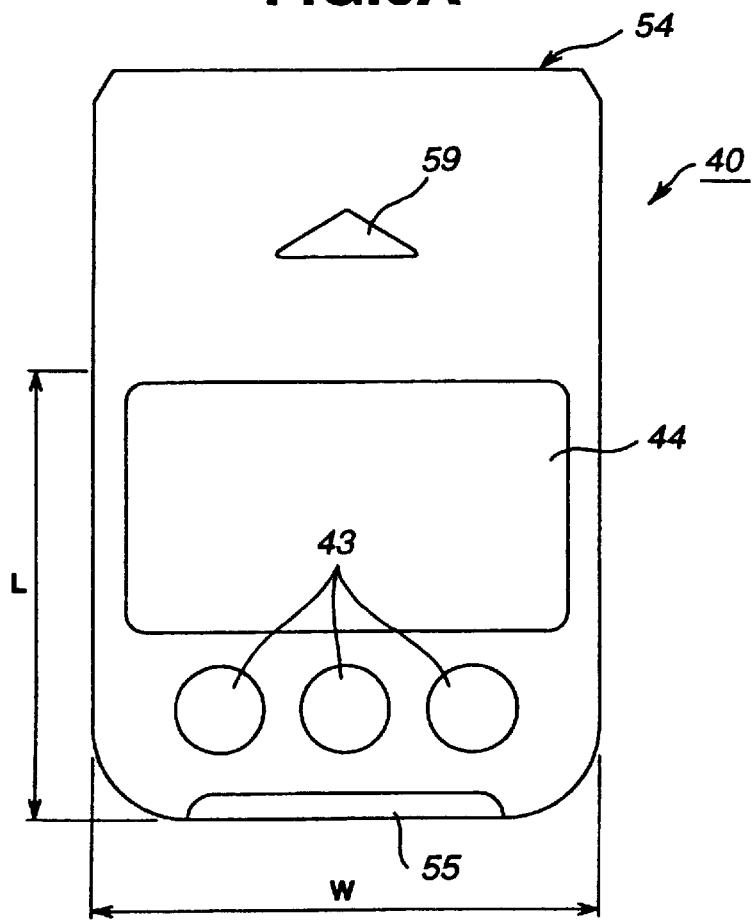
Figure 6C:
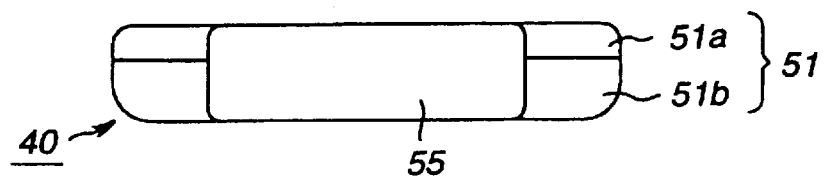

FIGS. 6A to C show appearance of memory card unit 40 as one embodiment of this invention. The upper surface of the memory card unit 40 is shown in FIG. 6B, the side surface of the insertion side thereof is shown in FIG. 6A, and the surface of the opposite side is shown in FIG. 6C.

As stated above, the memory card unit 40 of the embodiment of this invention is different in appearance from the conventional memory card in that it includes a button switch 43 for inputting event, a display screen 44 of liquid crystal display device (LCD), etc. and a wireless communication window 55 for carrying out wireless communication by, e.g., infrared rays in wireless communication means 48 which will be described later.

In this example, shape and/or dimension W, L, etc. of the connector portion 54 are similar to those of the conventional memory card 80 used in the conventional video game device 11.

This memory card device 40 is composed of a housing 51 composed of an upper shell 51*a* and a lower shell 51*b* formed so that it is substantially square, and a base (substrate) 56 on which memory element, etc. is mounted within this housing 51. The housing 51 is adapted to be inserted into slot portions 7A, 7B of the body of the video game unit 1, and a connector portion 54 in which a rectangular window is formed is provided at the side surface of its end. Terminals 57 for power and signal are disposed on the base 56 within the window of this connector portion 54, and are faced thereto. In addition, at the side surface opposite to the side of the connector portion 54 of the housing 51, there is provided a wireless communication window 55 for carrying out the above-described wireless communication.

At the upper surface of the housing 51, there is provided a direction indication mark 59 indicating direction in which this memory card unit 40 is inserted into slot portions 7A, 7B of the body of the video game unit 1. User can discriminate, with ease, its direction and surface/back in insertion into the game apparatus body 2 by this mark 59. It is to be noted that the mark 59 is not limited to the shape illustrated in FIG. 6B, and may has a shape which can be utilized as stop of slipping off in attaching/detaching the memory card unit 40 with respect to slot portions 7A, 7B of the body of the video game apparatus 1.

Figure 7B:
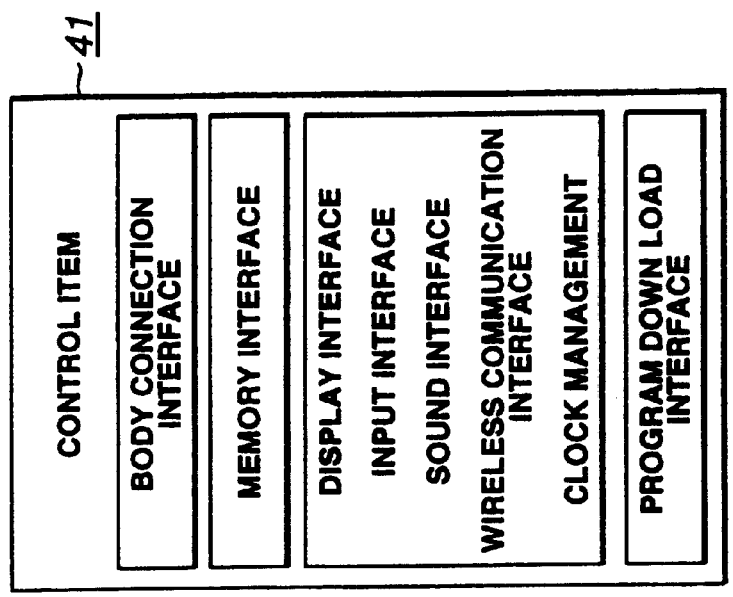
FIGS. 7A, 7B are block diagrams showing an example of the configuration of the main part of the memory card device of the embodiment according to this invention.
Figure 7A:
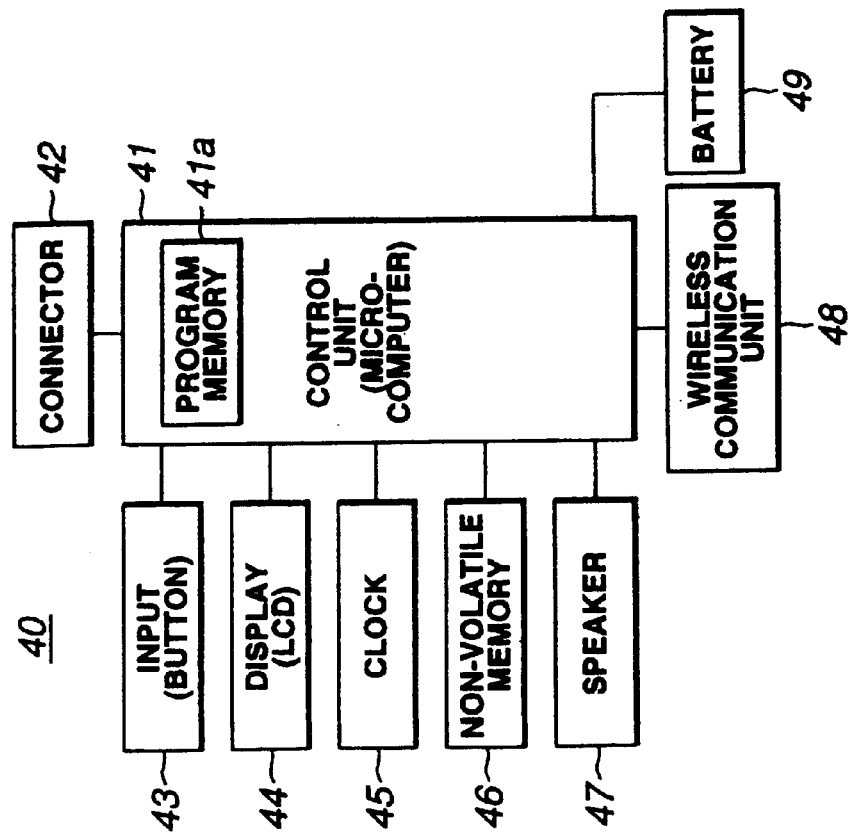

FIG. 7A is a block diagram showing an example of the configuration of the principal part of the memory card device 40.

Similarly to the previously described conventional memory card 80, the memory card unit 40 comprises a control unit 41 for controlling its operation, a connector 42 for connecting to slot of information equipment, etc., a non-volatile memory 46 serving as element for storing data.

The control unit 41 is constituted by using, e.g., microcomputer, and includes therewithin a program memory portion 41*a* for storing program. In addition, as non-volatile memory 46, there is used semiconductor memory element in which even if power is turned OFF, recorded state is left like flash memory. It is to be noted that as the memory card device 40 of the embodiment of this invention, because it is caused to be of configuration comprising a battery 49 as described later, there may be used Static Random Access Memory (SRAM) which can carry out input/output of data at high speed as non-volatile memory 46.

The memory card unit 40 differs from the above in that it comprises, in addition to the above-mentioned configuration, a button switch (operation (event) switch) 43 for operating program stored therewithin, a display screen 44 of liquid crystal display unit (LCD), etc. for displaying various information in accordance with the program, a wireless communication section 48 for carrying out transmission/reception of data by infrared rays between this memory card unit 40 and other memory card unit, etc., and a battery 49 for supplying power to the respective portions.

Moreover, the memory card device 40 includes therewithin small battery 49 for supplying power. For this reason, even in the state where it is taken out from the slot portions 7A, 7B of the video game apparatus 1, the memory card device 40 can be operated by itself In this example, the battery 49 may be chargeable, and there may be employed a configuration such that in the state where the memory card device 40 is inserted into the slot portions 7A, 7B of the body of the video game apparatus 1, power is supplied from the video game apparatus 1.

This memory card device 40 further comprises a clock 45 and a speaker 47 for producing sound in accordance with the program. In this example, the above-mentioned respective portions are all connected to the control section 41, and are operative in accordance with control of the control section 41.

FIG. 7B shows control item of the control section 41. While conventional memory card 80 only comprises body connection interface to information equipment and memory interface for carrying out input/output of data to the memory, the memory card device 40 of the embodiment of this invention comprises, in addition to the above-mentioned interfaces, display interface, operation input interface, speech (sound) interface, wireless communication interface, clock management and program down load interface.

Since the memory card device 40 is adapted so that the control unit (microcomputer) 41 is caused to have interface (driver) for carrying out management of functions supplemented by this invention independently of body connection interface and non-volatile memory management which are the conventional function, compatibility with the conventional functions can be maintained.

Moreover, since this memory card device 40 is caused to be of configuration comprising button switch 43 for operating program to be executed and display screen 44 using Liquid Crystal Display unit (LCD), etc., when game application is caused to be operative, application as portable game apparatus can be made.

In addition, since this memory card device 40 has the function to store application program to be down loaded from the body of the video game apparatus 1 into program memory section 41*a* within the microcomputer 41, it is possible to easily change application program or various driver software operated on the memory card device 40.

As explained above, the memory card device 40 of the embodiment of this invention can control operation independently of the video game apparatus 1. Accordingly, at the memory card device 40 side, it is possible to independently prepare data by application stored in the program memory section 41*a* for storing program independently of application software of the video game apparatus 1 side. Moreover, by carrying out transmission/reception of this data to and from the video game apparatus 1, cooperative operation (link) between the memory card device 40 and the video game apparatus 1 can be made.

Further, as the result of the fact that the memory card device 40 comprises clock 45, time data can be shared with the video game apparatus 1 side. Namely, not only respective time data are caused to be in correspondence with each other, but also data for controlling, in accordance with actual time, progression of game that respective sides independently execute can be shared.

A more practical example of the cooperative (link) operation between the video game apparatus 1 and the memory card device 40 which are described above will now be described later.

Figure 8:
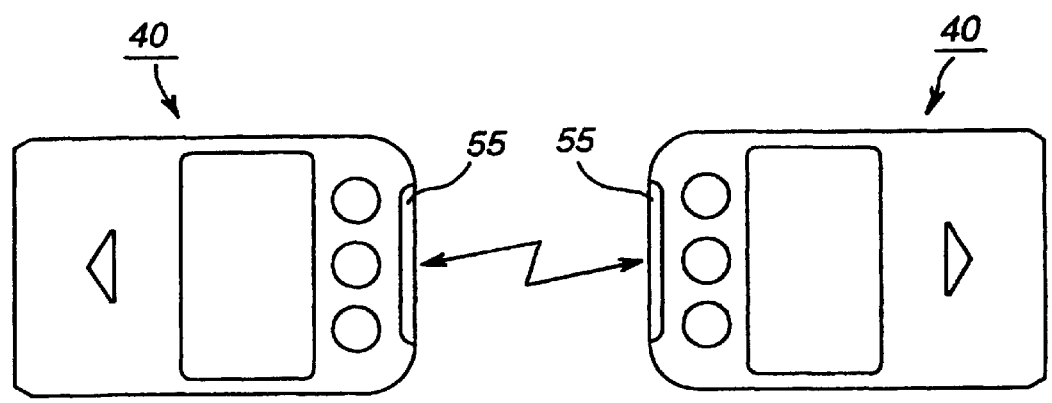
FIG. 8 is a view for explaining wireless communication function of the memory card device of the embodiment according to this invention.

FIG. 8 shows, in a model form, the state where wireless communication is carried out between memory card devices 40 of the embodiment of this invention. As stated above, the memory card device 40 is adapted to carry out transmission/reception of data through wireless communication windows 55 for carrying out wireless communication by infrared rays, etc. at the wireless communication section 48, thereby making it possible to carry out transmission/reception of internal data between plural memory card devices. In this example, the above-mentioned internal data is assumed to include, as well, data transferred from information equipment side, e.g., video game apparatus, etc. and stored in the storage memory (program memory 41a, non-volatile memory 46) within the memory card device.

It is to be noted while explanation has been given in the above-described embodiment in connection with the case where the memory card device of the embodiment of this invention is used as the auxiliary memory unit of the video game apparatus, applied device of the memory card device of the embodiment of this invention is not limited to the video game apparatus. For example, it is a matter of course that this invention can be applied to retrieval, etc. of various information, etc.

The cooperative operation between the memory card device 40 and the video game apparatus 1 of the previously described embodiment of this invention will now be described.

As previously described, the memory card device 40 can share game data generated by the microcomputer 41 serving as the control unit, time data obtained at the clock 45 within the memory card and data generated at other memory card obtained through wireless communication unit 48, etc. with the body of the video game apparatus 1.

Figure 9:
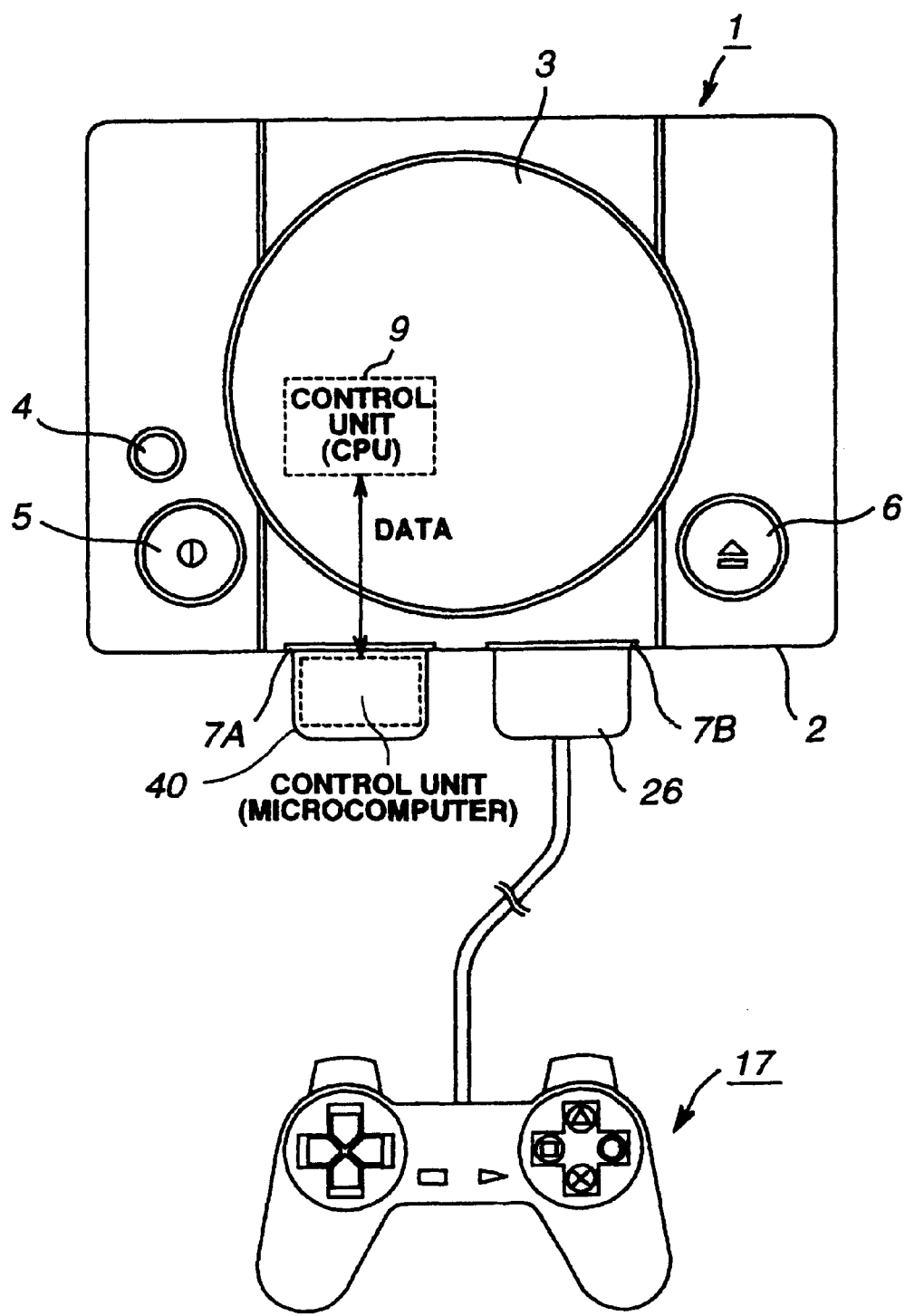
FIG. 9 is a view for explaining cooperative operation between the video game apparatus body and the memory card of the embodiment according to this invention.

FIG. 9 shows, in a model form, the state where cooperative operation is carried out between the video game apparatus 1 and the memory card device 40.

Explanation will now be given, as an example of such cooperative operation, in connection with the case where optical disc (CD-ROM) serving as recording medium on which program of application software is recorded is loaded with respect to the body of the video game apparatus 1 and program which has been read out therefrom is down-loaded into the memory card device 40 inserted into the slot portion 7A or 7B of the body of the video game apparatus 1.

Initially, prior to more practical explanation with respect to the cooperative operation, explanation will be given in connection with down load of program serving as the premise for carrying out the cooperative operation.

Figure 10:
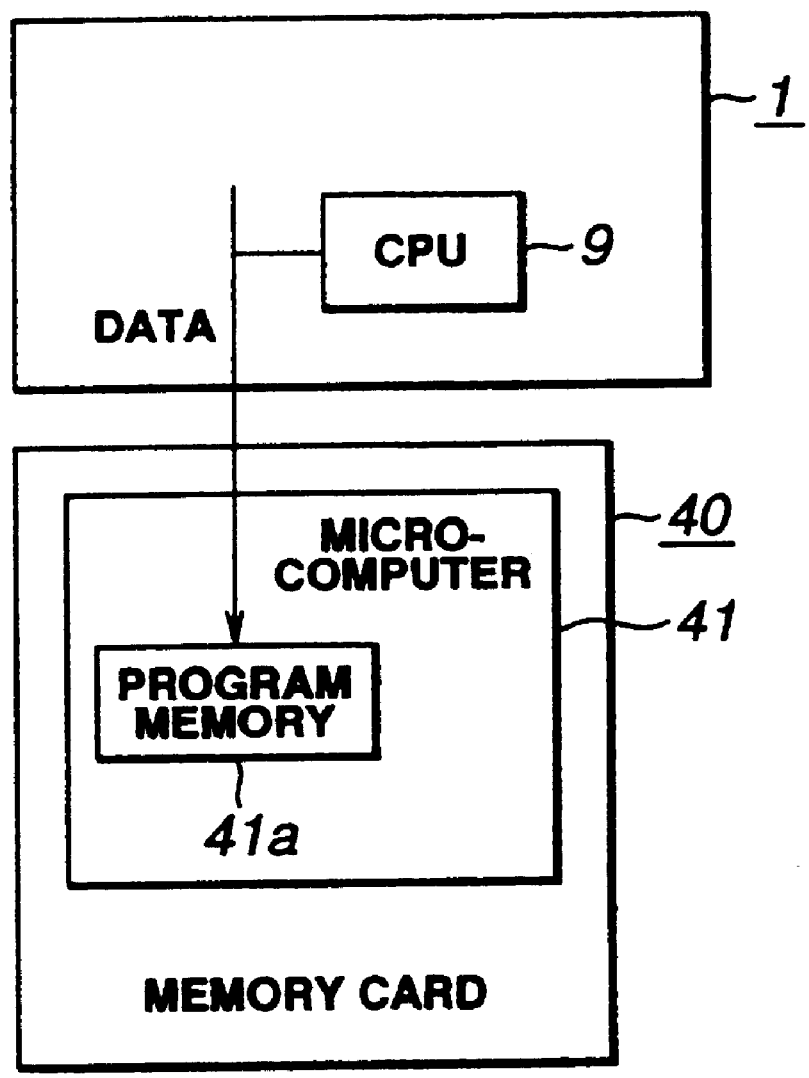
FIG. 10 is a view showing flow of program data which is down-loaded into the memory card from the video game apparatus body.

FIG. 10 shows flow of data in the case where application program of video game delivered from optical disc (CD-ROM), etc. loaded with respect to the disc loading portion 3 of the video game apparatus 1 is directly transferred (down-loaded) into the program memory portion 41a for storing program within the microcomputer 41 serving as the control unit of the memory card device 40 through CPU9 serving as the control unit of the video game apparatus 1.

Figure 11:
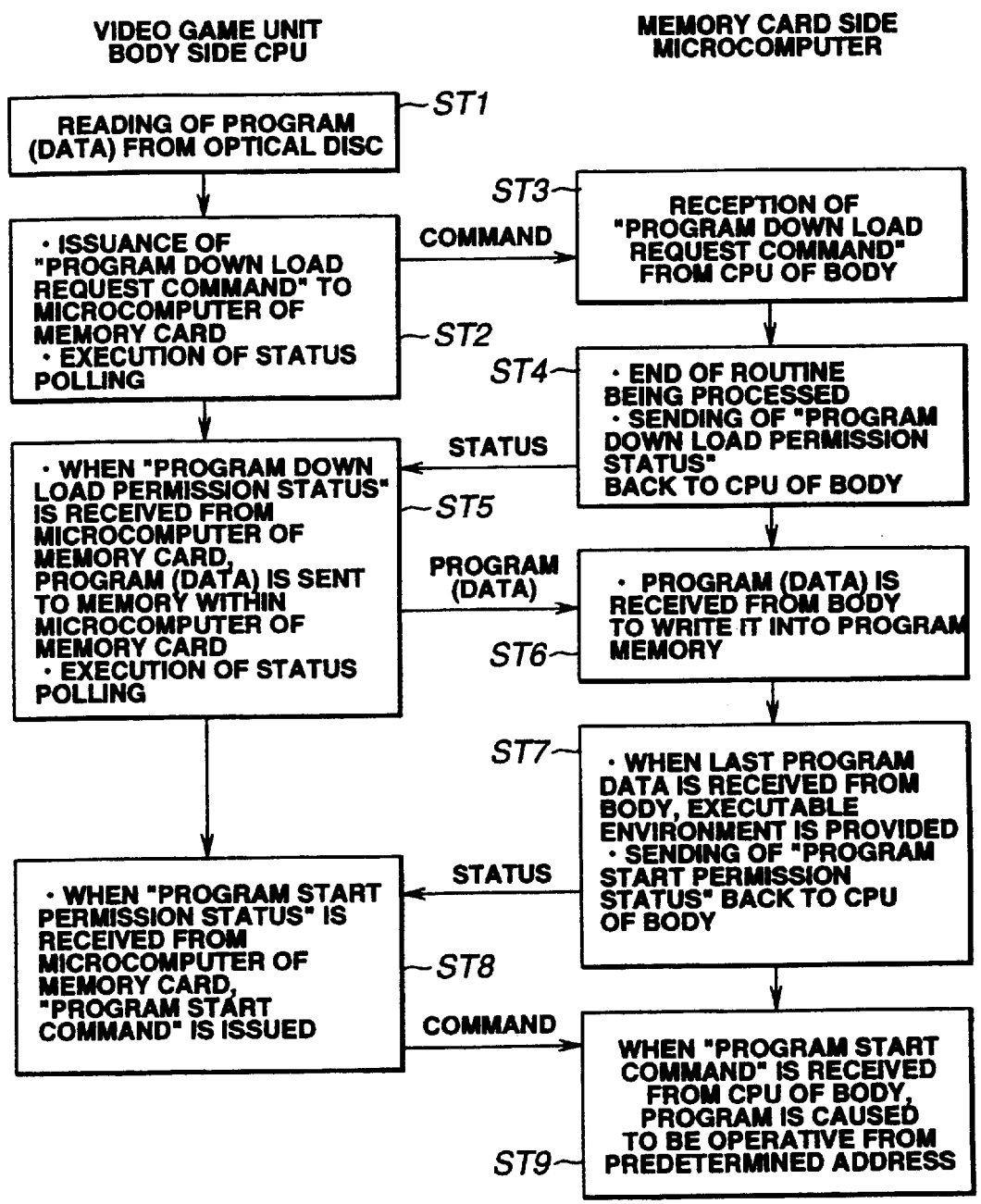
FIG. 11 is a view showing procedure of the down load.

FIG. 11 shows procedure of the above-mentioned down load.

At step ST1, application program of video game operated on the microcomputer within the memory card device 40 is read out as data from CD-ROM loaded with respect to disc loading portion 3 of the body of the video game apparatus 1 (hereinafter simply referred to as body). It is to be noted that, as previously described, in general, this application program is program different from the program operated on the body of the video game apparatus 1.

Then, at step ST2, the CPU9 serving as the control section of the body issues "Program Down Load Request Command" to the microcomputer 41 serving as the control unit of the memory card device 40. Further, the CPU9 carries out polling for receiving "Program Down Load Permission Status" from the microcomputer 41. In this case, the polling referred to here is a method of inquiring presence/absence of service request to carry out service.

At step ST3, the microcomputer 41 of the memory card device 40 side receives "Program Down Load Request Command" from the CPU9 of the body.

Further, at step ST4, when the microcomputer 41 of the memory card side completes the routine being processed so that there results the state where program down load can be executed, it sends "Program Down Load Permission Status" back to the CPU9 of the body.

Then, when the CPU9 of the body receives "Program Down Load Permission Status" from the microcomputer 41 of the memory card device 40 side at step ST5, it transfers (down-loads) program which has been read out from CD-ROM, etc. at the step ST1 to the program memory section 41a for storing program of the memory card device 40 to write it thereinto. Further, the CPU 9 carries out polling for the purpose of receiving "Program Start Permission Status" from the microcomputer 41.

At this time, address of the program memory section 41a into which down-loaded data is written is caused to undergo management by the microcomputer 41. Moreover, while the case where program down-loaded from the body is stored into the program memory section 41a within the microcomputer 41 is taken as an example in the above-explanation, such program may be stored into memory element such as SRAM, etc. capable of carrying out input/output of data at high speed.

At step ST6, the microcomputer 41 of the memory card device 40 receives, as data, program transferred from the body to write it into the program memory section 41a. At this time, it looks that program data is directly written into the program memory section 41a of the memory card device 40 from the CPU 9 of the body, In addition, as described above, address of the program memory section 41a is caused to undergo management by the microcomputer 41 as described above.

Then, at step ST7, when the microcomputer 41 of the memory card device 40 receives last program data from the body so that there results executable environment, it sends "Program Start Permission Status" back to the CPU9 of the body.

At step ST8, the CPU9 of the body receives "Program Start Permission Status" from the microcomputer 41 of the memory card device 40 to issue "Program Start Command".

Further, when the microcomputer 41 of the memory card device 40 receives "Program Start Command" from the CPU9 of the body, it operates program from a predetermined address determined in advance.

By the procedure described above, application program is directly transferred (down-loaded), from the body of the video game apparatus 1, into the program memory section 41a provided within the microcomputer 41 of the memory card device 40 inserted with respect to the body.

It is to be noted that the medium for delivering application program is not limited to the recording medium such as optical disc, etc. as previously described, but such application program may be delivered through the communication line. In that case, only step ST1 is different in the above-mentioned procedure.

Meanwhile, the above-mentioned down load procedure has been described in connection with the down load procedure in which application program is directly down loaded, from the body of the video game apparatus 1, into the program memory section 41a within the microcomputer 41 serving as the control unit of the memory card device 40 inserted with respect to the body.

On the contrary, there are instances where the CPU9 of the body down-loads data of application program into the non-volatile memory 46 within the memory card device 40 thereafter to copy that data into the program memory section 41a within the microcomputer 41 to execute it.

Figure 12:
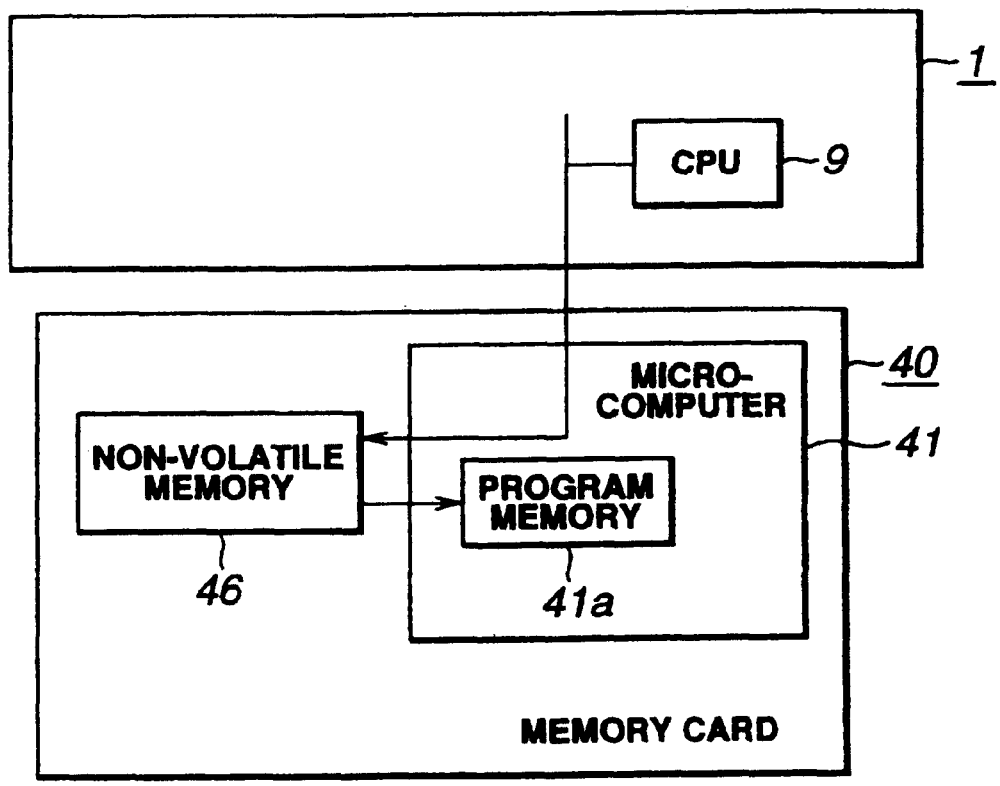
FIG. 12 is a view showing another flow of program data which is down-loaded into the memory card from the video game apparatus body.

FIG. 12 shows flow of data in such a case. Namely, application program of video game delivered from optical disc, etc. loaded with respect to the disc loading section 3 of the video game apparatus 1 is transferred (down-loaded) into non-volatile memory 46 within the memory card device 40 through the CPU9 serving as the control unit of the video game apparatus 1, and is then copied into the program memory section 41a within the microcomputer 41 serving as the control unit so that it is executed.

Figure 13:
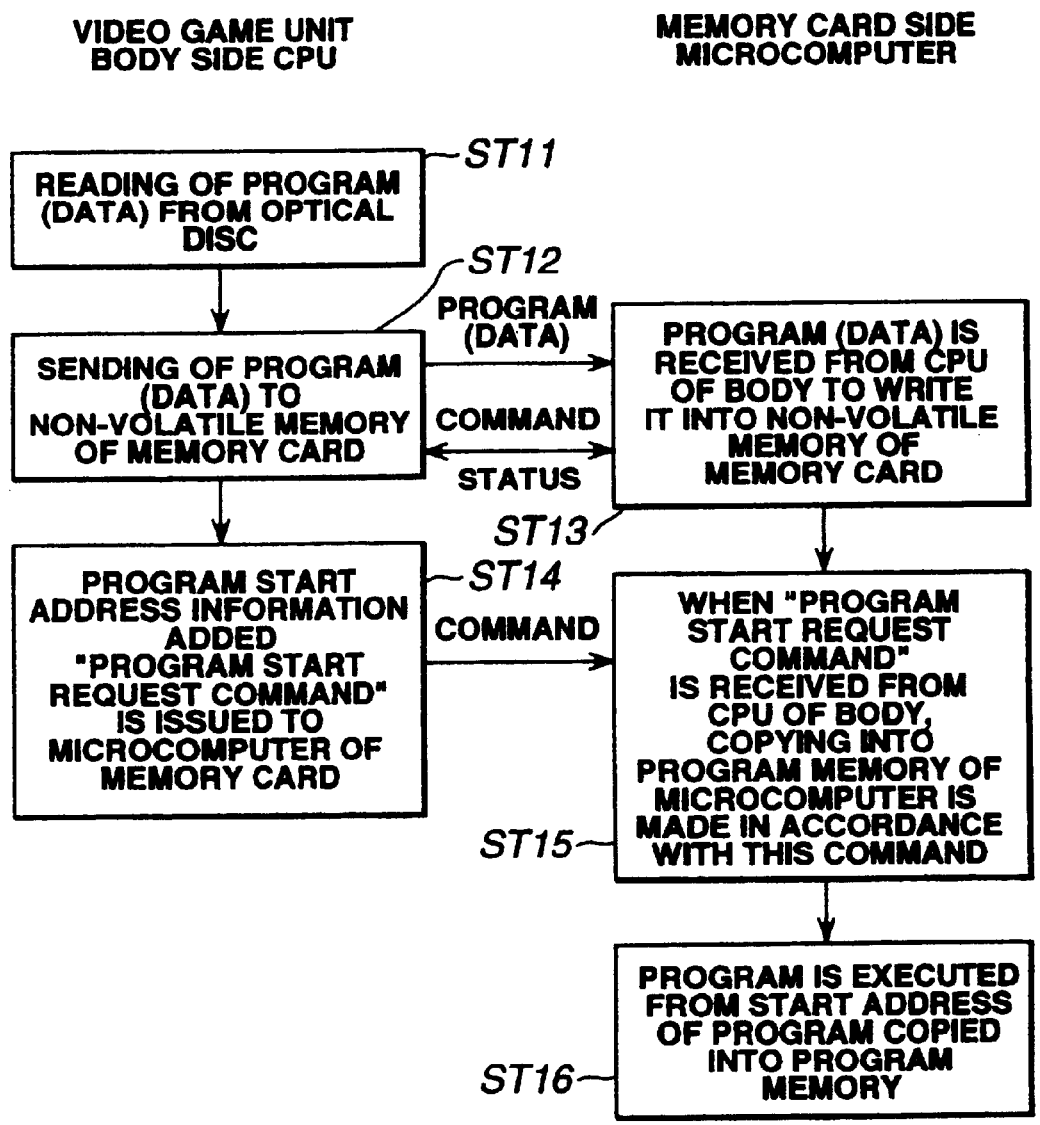
FIG. 13 is a view showing procedure of the down load.

FIG. 13 shows the procedure of the above-mentioned down load.

At step ST11, application program of video game operated on the microcomputer within the memory card device 40 is read out as data from CD-ROM loaded with respect to the disc loading section 3 of the body of the video game apparatus 1 (hereinafter simply referred to as body).

Then, at step ST12, the CPU 9 serving as the control unit of the body transfers (down loads) program data which has been read out from the CD-ROM into the non-volatile memory 46 of the memory card device 40. This procedure is similar to the case where back-up of data is carried out in the conventional video game apparatus 11, etc.

Then, at step ST13, the microcomputer 41 serving as the control section of the memory card device 40 receives, as data, application program transferred from the CPU9 of the body by the procedure similar to the conventional data back-up to write it into the non-volatile memory 46.

Then, at step S14, when the microcomputer 41 of the memory card device 40 receives "Program Start Request Command" from the CPU9 of the body, it copies data of designated size into the program memory section 41a within the microcomputer 41 from address designated by the command of the non-volatile memory 46.

Then, the microcomputer 41 of the memory card device 40 executes program copied into the program memory section 41a from its start address.

By the above-mentioned procedure, program of application software is transferred (down loaded), from the body of the video game apparatus 1, as data, through the non-volatile memory 46, into the program memory section 41a provided within the microcomputer 41 of the memory card device 40 inserted with respect to the body.

It is to be noted that, in general, application program down-loaded from the video game apparatus 1 into the memory card device 40 is program different from program operated on the body of the video game apparatus 1. It is a matter of course that the down-loaded application program may be program operated both on the video game apparatus 1 and on the memory card device 40. In this case, there takes place the restriction that the CPU of the video game apparatus 1 side and the microcomputer of the memory card device 40 side are the same processor.

Explanation will now be given in connection with the cooperative (link) operation in which programs of application software down-loaded by the previously described procedure from the body of the video game apparatus 1 are independently executed on the memory card device 40 to carry out transmission/reception of its execution result between the memory card device 40 and the video game apparatus 1.

In this example, attribute data of persons or characters who appear on the so-called role playing game, etc., which is operated on the body of the video game apparatus 1, is down-loaded into the memory card device 40. In this case, the above-mentioned attribute data is data representing the degree of growth and/or characters, etc.

Then, dramatis personae or characters are brought up on the program executed by the microcomputer 41 within the memory card device 40 to thereby change those attributes in a manner independent of program executed in the body of the video game apparatus 1.

Figure 14:
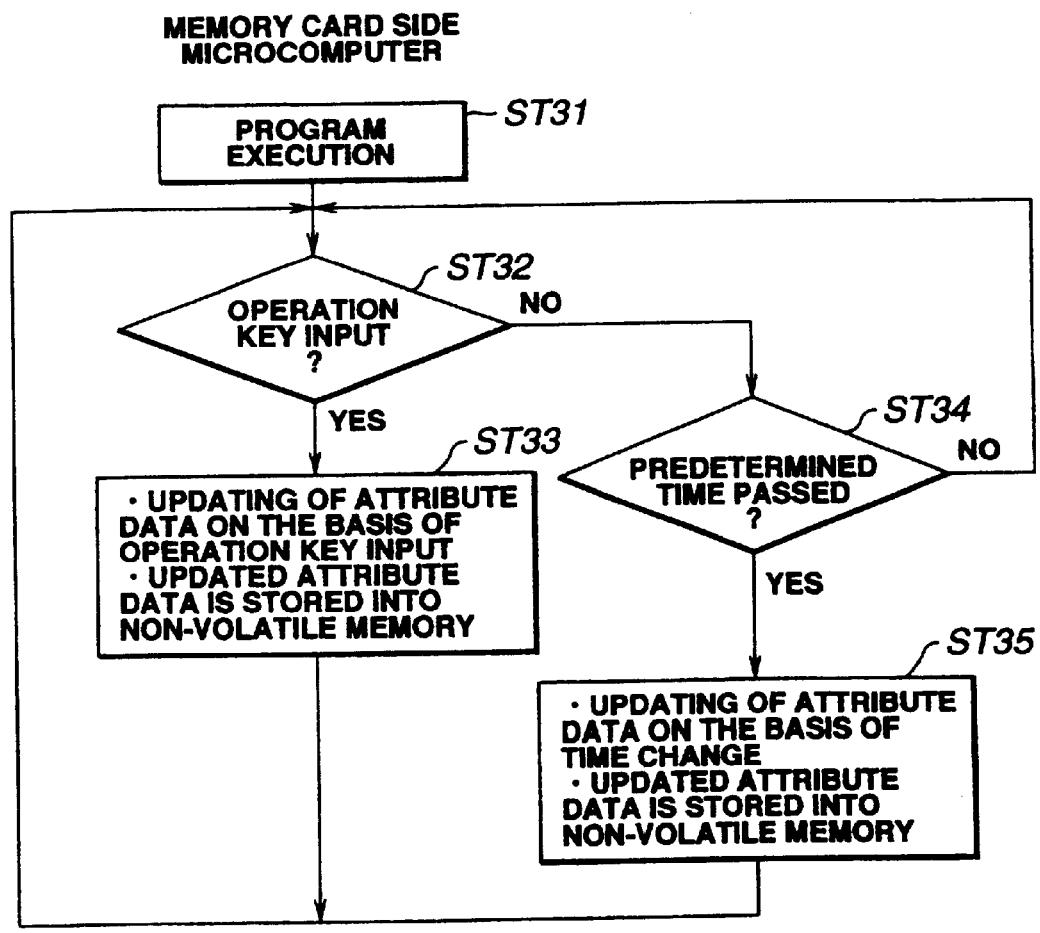
FIG. 14 is a view showing procedure for bringing up dramatis personae or characters on the memory card device.

FIG. 14 shows procedure for bringing up dramatis personae or characters on the memory card device 40.

At step ST31, user initially pushes down button switch 43 of the memory card device 40, whereby execution of application program is started.

Then, at step ST32, whether or not data input for bringing up dramatis personae or characters is inputted through button switch 43 is judged. In the case where data is inputted, processing proceeds to step ST33. In the case where no data is inputted, processing proceeds to step ST34.

At the step ST33, attribute data is updated (changed) on the basis of data inputted from the button switch 43. Further, its updated (changed) attribute data is stored into the non-volatile memory 46.

Moreover, in the case where processing proceeds to the step ST34, whether or not a predetermined time has been passed is judged by utilizing clock included therewithin at the step ST34. In the case where the predetermined time has been passed, processing proceeds to step ST35.

At the step ST35, attribute data is updated (changed) on the basis of time change. Further, its updated (changed) attribute data is stored into the non-volatile memory 46.

By repeating the above-described operation, it is possible to vary attribute data on the memory card device 40 independently of program executed at the body of the video game apparatus.

Such memory card device 40 of the embodiment of this invention is constituted so that it is operative by itself and is compact and convenient for portability. For this reason, user (game player) can carry, at any time, dramatis personae or characters who appear by program executed on this memory card device 40 to bring up them. Moreover, user can also transfer (up load) attribute of dramatis personae or characters brought up at hand to the body of video game apparatus 1 from the memory card device 40. In this case, it is also possible to take therein dramatis personae or characters of whom attributes have been changed into program executed on the body of the video game apparatus 1 to operate them.

Figure 15:
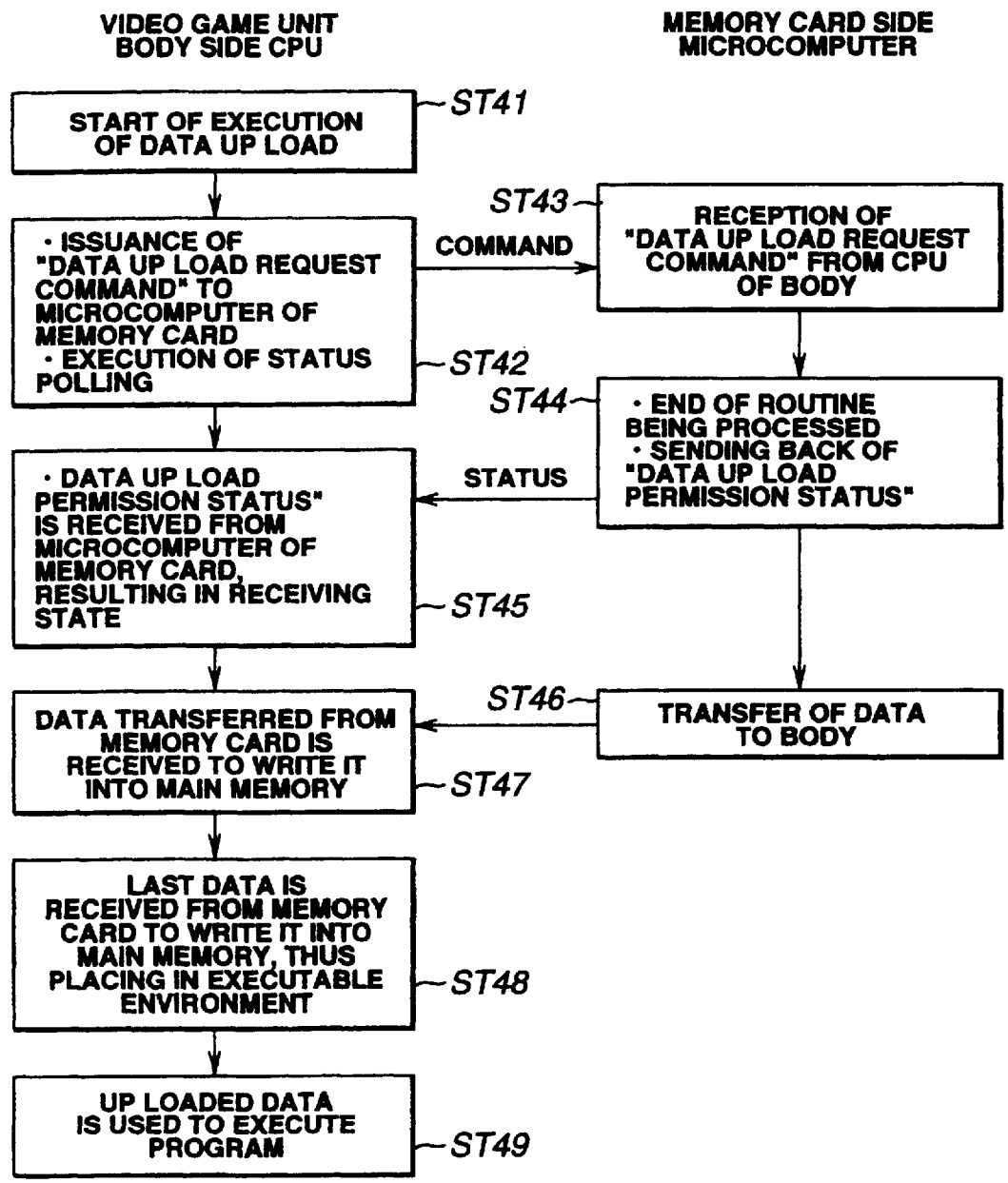
FIG. 15 is a view showing procedure for transferring (up-loading) attribute (attribute data) of dramatis personae or characters that user has brought up on the memory card device to the body of video game apparatus from the memory card device.

FIG. 15 shows procedure for transferring (up loading) attribute (attribute data) of dramatis personae or characters that user has brought up on the memory card device 40 from the memory card device 40 to the body of the video game apparatus 1.

At step ST41, initially, by the instruction that user uses controller connected to the body of the video game apparatus 1, execution of up load of attribute data is started.

Then, at step ST42, the CPU9 serving as the control unit of the body issues "Program Up Load Request Command" to the microcomputer 41 serving as the control unit of the memory card device 40. Further, the CPU9 carries out polling for the purpose of receiving "Program Up Load Permission Status" from the microcomputer 41.

At step ST43, the microcomputer 41 of the memory card device 40 side receives "Program Up Load Request Command" from the CPU9 of the body.

Further, at step ST44, when the microcomputer 41 of the memory card device 40 side completes routine being processed so that there results the state where execution of program up load can be made, it sends "Program Up Load Permission Status" back to the CPU9 of the body.

Then, at step ST45, the CPU9 of the body receives "Program Up Load Permission Status" from the microcomputer 41 of the memory card device 40 side, resulting in receiving state of attribute data from the memory card device 40.

At step ST46, the microcomputer 41 of the memory card device 40 reads out attribute data from the non-volatile memory 46 to transfer (up load) its attribute data to the body of the video game apparatus 1. Further, the CPU9 of the video game apparatus 1 receives attribute data at step ST47 to write it into the main memory 153. At this time, address of the main memory section 41a into which up-loaded attribute data is written is caused to undergo management by the microcomputer 41.

Further, at step ST48, the CPU 9 of the body of the video game apparatus 1 receives last attribute data from the memory card device 40 to set an environment such that attribute data representing changed dramatis personae or characters can be utilized in application program executed on the body of the video game apparatus 1 to inform user that current environment is set to that environment.

Further, in the case where it is instructed (indicated) by user to execute application program at the newly set environment, i.e., by using up loaded attribute data, the CPU9 of the video game apparatus 1 executes its application program at step ST49.

By the above-mentioned procedure, it is possible to execute, on the video game apparatus, application program reflecting attribute data of dramatis personae or characters independently changed on the memory card device 40.

It is to be noted while such a procedure is taken at step ST46 in the above-described flowchart to allow the microcomputer of the memory card device 40 to transfer attribute data of the non-volatile memory 46 to the video game apparatus 1 to thereby realize up load of attribute data, the CPU9 of the video game apparatus 1 may read out attribute data of the non-volatile memory 46 of the memory card device 40 to thereby realize up load of attribute data.

As explained above, such an approach is employed in both the body of the video game apparatus 1 and the memory card device 40 to share attribute data of dramatis personae, etc. and to change each other respective attribute data, thereby making it possible to constitute video game which can carry out cooperative operation.

Namely, in accordance with this invention, in the memory card device comprising memory for storing data and interface for connecting to information equipment and functioning as auxiliary memory unit of connected information equipment, the device comprising program storage memory for storing program, control unit for controlling execution of program, display unit for displaying information in accordance with program to be executed, operation input unit for operating program, and power supply unit for supplying power utilized for the purpose of executing program, thereby making it possible to provide memory card device which can not only store data but also down-load program, and to independently execute down-loaded program, and to carry out cooperative operation while carrying out transmission/reception of its execution result between the memory card device and other information equipment.

Moreover, in accordance with this invention, there is provided video game apparatus having a function to store game data obtained by executing game into the auxiliary memory unit, the apparatus comprising program providing unit for delivering application program, communication control unit connected to main bus to which central processing unit of the video game apparatus body is connected, and slot connected to the main bus through the communication control unit and adapted so that the auxiliary memory unit is detachably connected, wherein since the central processing unit has a control function to down-load application program from the program providing unit into the auxiliary memory unit through the communication control unit, the auxiliary memory unit is caused to independently execute application program to have ability to carry out cooperative operation to take thereinto its execution result to constitute game, etc.

Further, in accordance with this invention, there can be provided video game apparatus having a function to store game data obtained by executing game into auxiliary memory unit, the apparatus comprising program providing unit for delivering application program, communication control unit connected to main bus to which central processing unit of the video game apparatus body is connected, and common slot connected to the main bus through the communication control unit and adapted so that the auxiliary memory unit and the memory card unit are detachably connected, wherein the auxiliary memory unit has non-volatile memory for storing game data obtained by executing game by the video game apparatus body, and since the memory card device includes program memory for storing down-loaded application program, and control unit for executing down-loaded application program independently of video game, storage of data to the auxiliary memory unit and down load of program with respect to the memory card device can be carried out through the common slot.

Further, in accordance with this invention, there can be provided memory card device having interface which can be connected to information equipment, the apparatus including program storage memory for storing program, control unit for controlling execution of program, display unit for displaying information in accordance with program to be executed, operation input unit for operating program, and power supply unit for supplying power utilized for executing program, wherein program is down-loaded into the program memory through interface from information equipment connected thereto, and since program down-loaded into the auxiliary memory unit and program executed at the information equipment body are application programs different from each other, program can be down-loaded, and program can be executed independently of the down-loaded program and cooperative operation can be carried out while carrying out transmission/reception of its execution result between the memory card device and other information equipment.

Further, in accordance with this invention, there can be provided memory card device having a function such that attribute data utilized at the control unit under program is down-loaded into the program memory through interface from connected information equipment to vary attribute data in accordance with input from the operation input unit, thereby making it possible to not only simply store data, but also independently execute application.

Further, in accordance with this invention, changed attribute data is up-loaded into information equipment, thereby making it possible to carry out cooperative operation while carrying out transmission/reception of execution result between the device and other information equipment.

Further, in accordance with this invention, there can be provided memory card device in which since program down-loaded into the auxiliary memory unit and program executed at information equipment are caused to be application programs different from each other, application can be independently executed.

In addition, in accordance with this invention, in providing medium for providing application program with respect to video game unit, at least two different application programs are recorded with respect to the providing medium, wherein one of the at least two different application programs is application program executed at the video game apparatus and the other one is application program executed at the memory card device connected to the video game apparatus, whereby program can be also down-loaded, and down-loaded program can be independently executed and cooperative operation can be carried out while carrying out transmission/reception of its execution result between the device and other information equipment.

What is claimed is:

1. A memory card device having an interface connectable to a video game apparatus, the device comprising:
    a first memory for storing data transferred from the video game apparatus as resultant data obtained through execution of a first program in the video game apparatus;
    a second memory for storing a second program;
    a control unit for controlling execution of the second program;
    a display unit for displaying information in accordance with the second program;
    an operation input unit for operating the second program; and
    a power supply unit for supplying power utilized for executing the second program,
    wherein the second program is down-loaded from the video game apparatus into the second memory through the interface connected between the second memory and the video game apparatus, and the second program down-loaded into the second memory and the first program executed at the video game apparatus are programs different from each other, and
    wherein the control unit executes the second program down-loaded into the second memory, and
    wherein attribute data utilized at the control unit under the second program is down-loaded into the second memory through the interface from the video game apparatus along with the second program, and the control unit has a function to vary the attribute data in accordance with input from the operation input unit.

2. A memory card device as set forth in claim 1,
    wherein changed attribute data is up-loaded into the video game apparatus.

3. A memory card device functioning as an auxiliary memory unit of a video game apparatus, comprising:
    a memory for storing data;
    an interface connected to the video game apparatus;
    a program storage memory for storing a program;
    a control unit that executes the program;
    a display unit for displaying information in accordance with the executed program;
    an operation input unit for operating the program; and
    a power supply unit for supplying power utilized for executing the program;
    wherein the program is down-loaded from the video game apparatus into the program storage memory through the interface connected between the program storage memory and the video game apparatus;
    wherein attribute data utilized in the control unit under the program is down-loaded into the program storage memory through the interface from the video game apparatus, and the control unit has a function to vary the attribute data in accordance with input from the operation input unit.

4. A memory card device as set forth in claim 3,
    wherein changed attribute data is up-loaded into the video game apparatus.

5. A memory card device having an interface connectable to a video game apparatus, the device comprising:
    a program storage memory for storing a program;
    a control unit that executes the program;
    a display unit for displaying information in accordance with the program;
    an operation input unit for operating the program; and
    a power supply unit for supplying power utilized for executing the program,
    wherein the program is down-loaded from the video game apparatus into the program storage memory through the interface connected between the program storage memory and the video game apparatus and the program down-loaded into the program storage memory and a game program executed at the video game apparatus are different from each other,
    and wherein attribute data utilized at the control unit under the program is down-loaded into the program storage memory through the interface from the video game apparatus along with the program, and the control unit has a function to vary the attribute data in accordance with input from the operation input unit.

6. A memory card device as set forth in claim 5,
    wherein changed attribute data is up-loaded into the video game apparatus.

* * * * *